United States Patent [19]

Alker et al.

[11] Patent Number: 4,665,555
[45] Date of Patent: May 12, 1987

[54] COMPUTER BASED DRAWING MANAGEMENT SYSTEM

[75] Inventors: Bruce B. Alker; Michael J. McGovern, both of Thousand Oaks, Calif.

[73] Assignee: Alpharel Incorporated, Camarillo, Calif.

[21] Appl. No.: 710,079

[22] Filed: Mar. 11, 1985

[51] Int. Cl.$^4$ .............................. G09G 1/06; G06K 9/00
[52] U.S. Cl. ........................................ 382/41; 340/724; 340/731; 340/747; 382/57
[58] Field of Search ............... 340/724, 731, 747; 382/41, 44, 56, 57; 353/25, 26 R, 26 A, 27 R, 27 A; 364/518, 521

[56] References Cited

U.S. PATENT DOCUMENTS

| | | | |
|---|---|---|---|
| 4,121,196 | 10/1978 | Johnson et al. | 382/41 |
| 4,197,590 | 4/1980 | Sukonick et al. | 340/731 |
| 4,388,610 | 6/1983 | Tsunekawa | 382/56 |
| 4,532,605 | 7/1985 | Waller | 340/731 |

Primary Examiner—Leo H. Boudreau
Attorney, Agent, or Firm—Freilich, Hornbaker, Rosen & Fernandez

[57] ABSTRACT

A system for use with large libraries of existing technical drawings for permitting the drawings to be electronically captured and digitally stored in a central data base. As needed, the documents can be retrieved, displayed, electronically revised, and printed out. The system includes scanners which scan existing drawings to generate a bit stream of pixel data which is then compressed and stored in a mass storage unit. A drawing revisory subsystem is provided capable of operating in a DRAWING REVISION MODE and a DRAWING REDISPLAY MODE. When operating in the DRAWING REVISION MODE, as the operator inputs revisory commands, the revisory subsystem generates primitives which modify the displayed drawing in real time by changing a bit map stored in a dedicated pixel memory driving a display monitor. Additionally, however, the revisory subsystem automatically caches the primitives defining the desired drawing revisions. At the completion of a revisory session, the cached primitives are grouped as a designated REVISION LEVEL and stored in the mass storage unit. When operating in the DRAWING REDISPLAY MODE, the compressed pixel data is expanded and stored in the pixel memory to cause the monitor to display the original drawing. The redisplayed drawing is then revised through its successive REVISION LEVELS in an incremental or cinematic manner by successively revising the bit map in the pixel memory.

12 Claims, 11 Drawing Figures

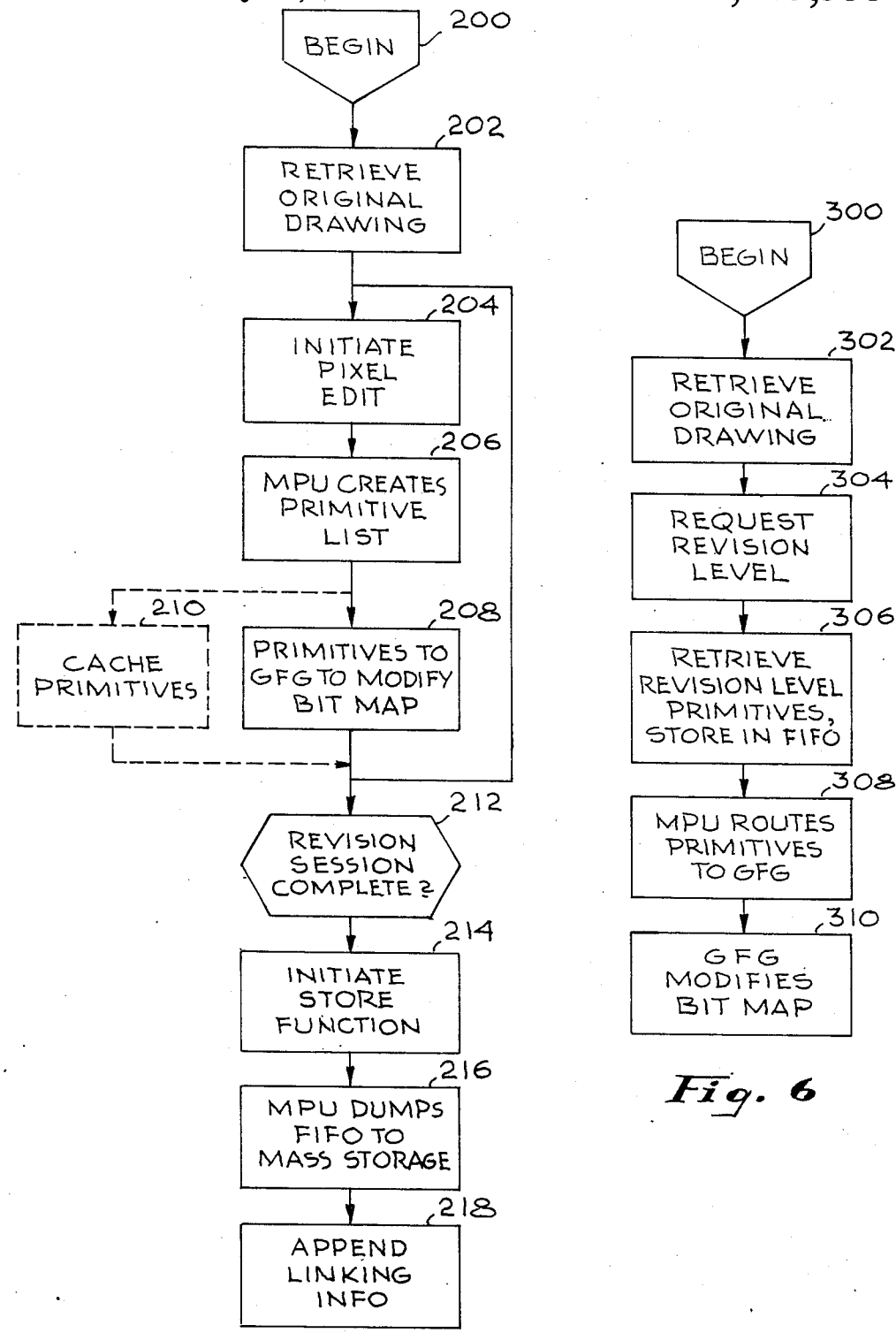

COMPUTER BASED DRAWING MANAGEMENT SYSTEM

FIELD OF THE INVENTION

This invention relates generally to computer based systems useful for electronically storing, revising, and displaying technical drawings and other documents. More specifically, this invention relates to improvements in such systems for greatly enhancing their ability to efficiently revise electronically stored drawings.

BACKGROUND OF THE INVENTION

Systems are disclosed in the prior art for electronically storing and retrieving documents. Such prior art systems variously utilize analog and digital storage techniques and are exemplified by U.S. Pat. Nos. 4,205,780 and 4,388,610. Additional patents variously show relevant subsystems for (1) scanning documents; (2) storing electronic document data; (3) modifying stored electronic data; and (4) displaying or producing hard copy output of stored data. For example, see:

IMAGE-DATA HANDLING

U.S. Pat. No. 4,394,774
U.S. Pat. No. 4,369,463
U.S. Pat. No. 4,307,377
U.S. Pat. No. 4,189,711
U.S. Pat. No. 3,876,831

STORAGE AND RETRIEVAL

U.S. Pat. No. 4,271,430
U.S. Pat. No. 4,152,722
U.S. Pat. No. 4,141,078
U.S. Pat. No. 4,020,463
U.S. Pat. No. 3,868,637
U.S. Pat. No. 3,854,004
U.S. Pat. No. 3,757,037
U.S. Pat. No. 3,751,582
U.S. Pat. No. 3,697,680

PRINTING, SCANNING, EDITING & STORING

U.S. Pat. No. 4,333,153
U.S. Pat. No. 4,270,173
U.S. Pat. No. 4,270,172
U.S. Pat. No. 4,231,096
U.S. Pat. No. 4,196,450
U.S. Pat. No. 4,038,493
U.S. Pat. No. 3,828,319
U.S. Pat. No. 3,653,071
U.S. Pat. No. 3,601,590

SUMMARY OF THE INVENTION

The present invention is particularly directed to an improved system for digitizing existing technical drawings and for storing the digital data so generated so that the data can later be retrieved for display, electronic revision, and hard copy output of the drawings.

Systems in accordance with the invention are intended primarily for use with large libraries of existing technical drawings to permit the drawings to be electronically captured and digitally stored in a central data base. As needed, the documents can then be retrieved, displayed, electronically revised, and printed out, if required. Systems in accordance with the invention are intended to accept a wide variety of existing drawing formats, e.g. from aperture cards to full size originals as well as a wide range of drawing sizes, e.g. from A size to K size. Similarly, the systems are intended to drive a variety of hard copy output devices including microfilm recorders and full size plotters.

A system in accordance with the present invention preferably utilizes high resolution scanners capable of scanning existing drawings to generate a bit stream of pixel data at a resolution of at least 200 points per inch. The raw pixel data so generated is then compressed and stored in a mass storage unit associated with a host central processing unit (CPU). The mass storage unit preferably comprises an optical disk unit capable of storing a great many data sets, each set relating to a different drawing. A graphic display terminal is provided having a monitor for displaying drawings and input means enabling an operator to identify stored drawings to be displayed and to describe revisions to be made to such drawings.

In accordance with a significant feature of the invention, a control ("drawing revisory") subsystem provided to interface the graphic display terminal to the host CPU is particularly configured to facilitate the generation, storage, and retrieval of drawing revision data. More particularly, when operating in a DRAWING REVISION MODE, as the operator inputs revisory commands via the graphic display terminal, the subsystem generates primitives (i.e. an elementary display instruction together with parameter data) which modify the displayed drawing in real time by changing the bit map stored in a dedicated pixel memory driving the terminal display monitor. Additionally, however, the revisory subsystem automatically caches the primitives defining the desired drawing revisions. At the completion of a revisory session, the cached primitives are grouped as a designated Revision Level and transferred via the host CPU to the mass storage unit. Each such stored Revision Level (e.g. Revision A) has information appended to it linking it to a related drawing data set.

In accordance with a significant aspect of the invention, the original drawings are stored in the mass storage unit in the form of highly compressed pixel data. However, the revisory data stored in the mass storage unit is in the form of primitives. When operating in the DRAWING REDISPLAY MODE, the compressed pixel data is accessed from mass storage, expanded, and stored in the pixel memory to cause the terminal monitor to display the original drawing.

In accordance with a significant feature of the invention, the redisplayed drawing is then revised through its successive REVISION LEVELS in an incremental or cinematic manner, level by level. This is accomplished by retrieving the stored primitives for each REVISION LEVEL and successively modifying the pixel memory in accordance therewith.

BRIEF DESCRIPTION OF THE DRAWINGS

FIGS. 5 and 6 comprise flow charts respectively describing system operation during the DRAWING REVISION MODE and the incremental DRAWING REDISPLAY MODE in accordance with the present invention;

FIGS. 9A, 9B, 9C contain Table 3 which depicts byte formats of exemplary display primitives.

DESCRIPTION OF PREFERRED EMBODIMENT

Figure 1:
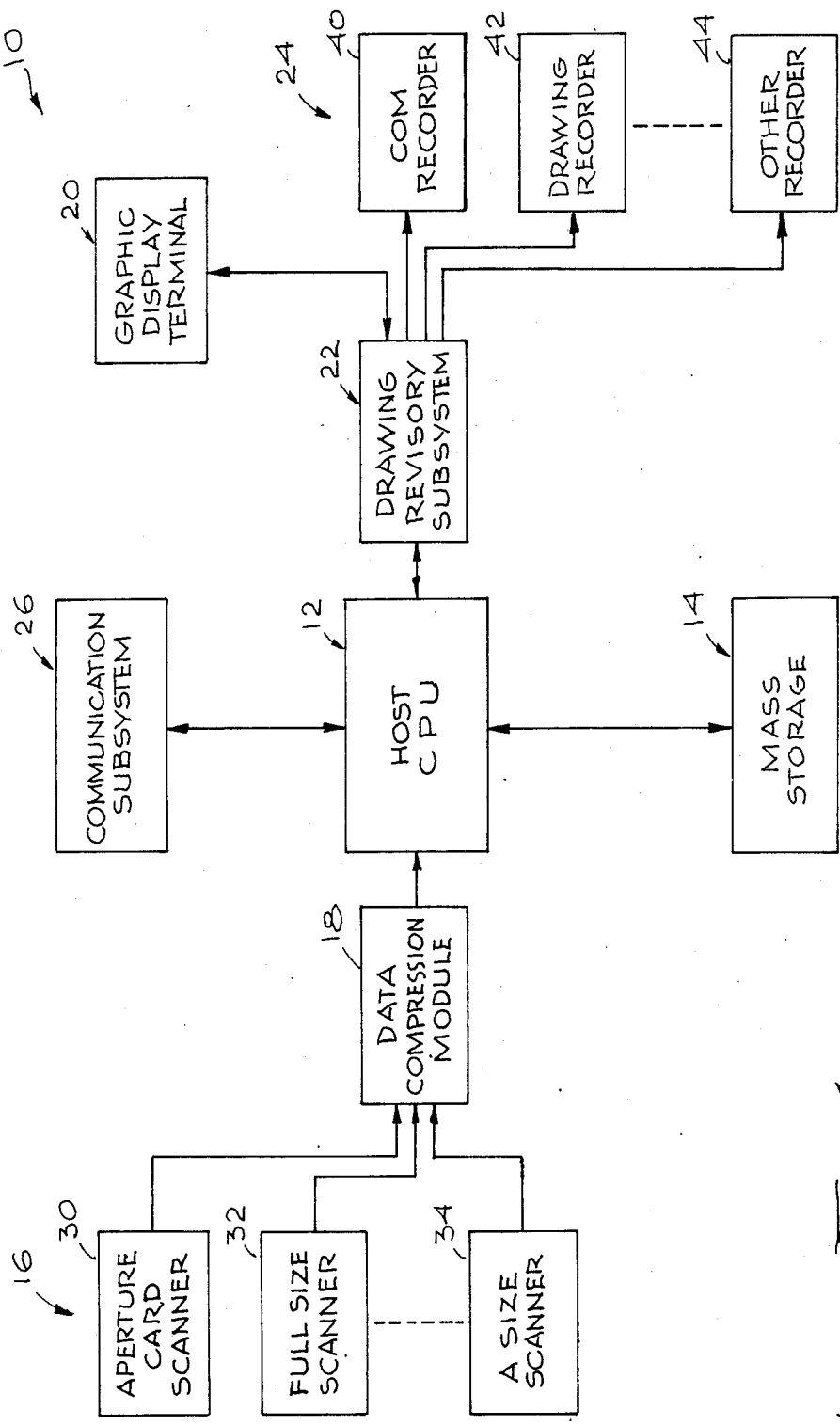
FIG. 1 is an overall block diagram of a drawing management system in accordance with the present invention.

Attention is now directed to FIG. 1 which comprises a block diagram of a drawing management system 10 in accordance with the present invention. The system includes a host central processing unit (CPU) 12 having a large mass storage unit 14 coupled thereto.

The system 10 is intended to operate with large libraries of existing technical drawings to facilitate the electronic storage, revision, display, and hard copy output of the drawings. In order to initially electronically capture the information in an existing physical drawing, an appropriate one of scanning devices 16 scans the drawing to generate a binary data stream representing the pixel information in the drawing. A compression module 18 processes the binary data stream and converts it to a highly compressed form enabling it to be efficiently stored as a unique drawing data set in the mass storage unit 14. It should be understood that each drawing is only scanned which it is initially presented to the system. This initial scanning results in the host CPU 12 storing a digital representation, i.e. a drawing data set of the drawing in mass storage unit 14. In subsequent operations involving each drawing, whether for display, revision, or hard printout, the data set corresponding to that drawing is accessed from mass storage 14 and operated upon.

System 10 further includes a graphic display terminal 20 which, as will be seen hereinafter, includes an operator input device and a display monitor. By proper utilization of the terminal 20, an operator communicates commands to the host CPU 12 via a control subsystem which, hereinafter, will generally be referred to as the drawing revisory subsystem 22.

In addition to interfacing the graphic display terminal 20 to the host CPU 12, the drawing revisory subsystem 22 interfaces CPU 12 with various output devices including display monitors and hard copy recorders 24. The system preferably also includes a communication subsystem 26 which enables system 10 to effectively operate with remote stations.

Prior to describing the preferred embodiment depicted in FIGS. 2-5, the intended application of system 10 will be briefly discussed. The system 10 is primarily intended for applications involving very large libraries of technical drawings (e.g. in excess of 100,000 drawings). Many large industrial companies, as well as government agencies maintain libraries of working and archival drawings of this size. The management of such libraries involves the storage, retrieval, revision, and reproduction of the drawings. This management function is generally cumbersome and expensive. Typically, the drawings vary in size from A size through K size as depicted by the following table:

TABLE 1

| DWG | SIZE (in.) |
|---|---|
| A | 8½ × 11 |
| B | 11 × 17 |
| C | 17 × 22 |
| D | 22 × 34 |
| E | 34 × 44 |
| F | 28 × 40 |
| G | 11 × 42–144 |
| H | 28 × 48–144 |
| J | 34 × 48–144 |
| K | 40 × 48–144 |

Also, the drawings may exist in different formats; i.e. full size on paper (or vellum) or reduced size on microfilm. However, it has become common practice in the industry at this time to capture most drawings on microfilm frames with each frame carried by what is known as an aperture card. Typically, the aperture cards are configured so that they can be readily handled by electromechanical storage and retrieval systems. In order to accommodate a typical existing drawing base containing the aforementioned variety of drawing sizes and formats, the system 10 preferably includes a variety of scanner devices 16. Thus, FIG. 1 depicts an exemplary scanner group including an aperture card scanner 30, a full size drawing scanner 32, and a high speed A size scanner 34.

Various commercially available scanner devices are compatible with the system of FIG. 1. Such scanner devices differ from one another in their performance characteristics including, for example, the rate at which they can operate, the variety of drawing formats which can be accommodated, and the resolution at which the drawings can be scanned. The details of such scanner units will not be discussed herein. For purposes of the present disclosure, it will be assumed that each of the scanners 16 is able to scan a drawing at an effective resolution of 200 lines per inch, both horizontally (X) and vertically (Y), and output a bit stream of raw pixel data representing the content of the drawing.

In accordance with the invention, the raw bit stream output of the scanner 16 is subjected to a compression operation in data compression module 18. Various compression techniques are known in the prior art which could be used to compress the raw scanner output. However, it will be assumed herein that the data is compressed in accordance with what is generally known as the Frank code described in U.S. Pat. Nos. 3,883,847; 4,103,287; 4,107,648; and 4,189,711.

The compressed digital data associated with a single drawing will herein be referred to as a drawing data set. One of the functions of the host CPU 12 is to store and keep track of the several hundred thousand data sets in a typical system. In accordance with the preferred embodiment, these data sets are stored in a mass storage unit 14, preferably an optical disk system having a storage capacity in the several hundred gigabyte range. An exemplary application of a system in accordance with the invention is depicted by the following Table 2 which demonstrates that a 421.8 gigabyte optical mass storage unit can store approximately four million drawing pages distributed variously amongst A–K size drawings.

TABLE 2

| | | MASS STORAGE REQUIREMENTS | | |
|---|---|---|---|---|
| DWG SIZE | NO. DWGS | MEGABYTES PER DWG. UNCOMPRESSED | COMPRESSION RATIO | GIGABYTES COMPRESSED |
| A | 800K | 0.4675 | 8.0 | 46.75 |
| B | 1160K | 0.935 | 15.0 | 72.30 |
| C | 920K | 1.87 | 20.0 | 86.02 |
| D | 840K | 3.74 | 25.0 | 125.66 |
| E | 80K | 7.48 | 30.0 | 19.95 |
| F-K | 200K | 6.16 | 30.0 | 41.06 |
| Totals 4000K Pages | | | | 391.74 |
| REMAINING STORAGE (Directories, etc.) | | | | 30.0 |
| GRAND TOTAL (400 Platters) | | | | 421.8 |

The graphic display terminal 20 is interfaced to the host CPU 12 by control means, designated as a drawing revisory subsystem 22, which is described in detail in the ensuing figures. Subsystem 22 is also used to drive a plurality of output recorders 24 and other output devices such as display terminals. The recorders 24 can include a computer output microfilm recorder 40, a full size drawing recorder or plotter 42, and any of various additional output devices 44 for producing aperture cards, roll film, etc. Suitable output recorders and displays are disclosed in the prior art, differing from one another in their performance characteristics such as output format flexibility, speed of operation, and output resolution. For purposes herein, it will be assumed that the recorder and output devices 24 operate at a resolution of 200 lines per inch.

Figure 2:
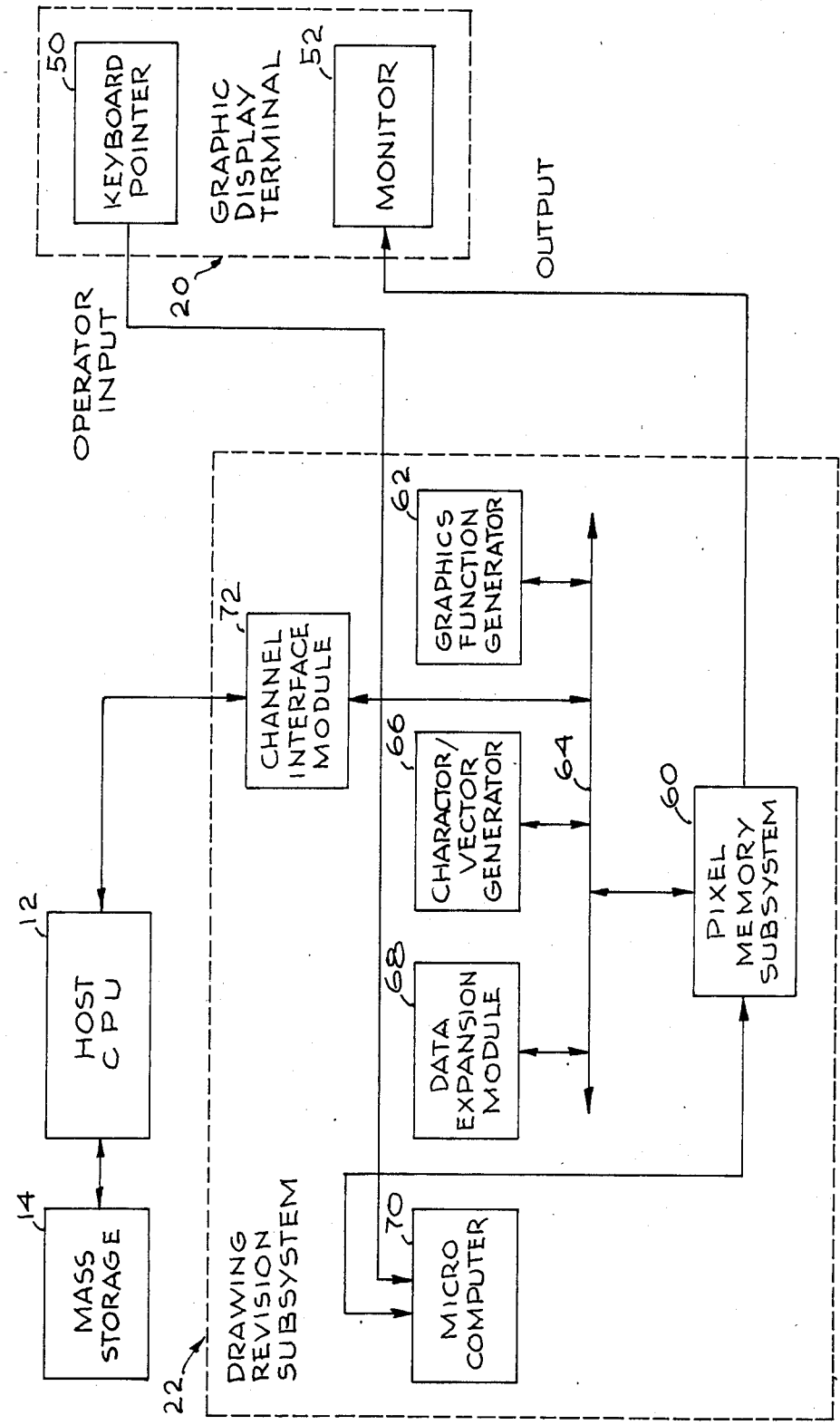
FIG. 2 is a block diagram primarily depicting the drawing revisory subsystem of FIG. 1.

Attention is now directed to FIG. 2 which illustrates the graphic display terminal 20 and drawing revisory subsystem 22 in greater detail. The graphic display terminal is comprised of a keyboard/pointer unit 50 enabling an operator to generate and communicate commands and data to the revisory subsystem 22. The graphic display terminal 20 additionally includes a monitor 52 for displaying drawings output by the revisory subsystem 22. The keyboard/pointer 50 is substantially conventional in nature and includes a keyboard and a pointing device such as a mouse or preferably a graphic tablet. The keyboard/pointer unit 50 is intended for use by an operator to issue commands and to designate points on the monitor display screen 52.

Briefly, in order to operate a system in accordance with the invention, it is initially assumed that the operator has the capability of selectively initiating either a DRAWING REVISION MODE or a DRAWING REDISPLAY MODE. Within each mode of operation, the operator is also able to issue commands identifying the particular drawing data set to be retrieved for display. When operating in the DRAWING REVISION MODE, the operator, via the keyboard/pointer unit 50 is able to revise the displayed drawing by issuing display commands together with related parameter data. As a singular example of such a display command, the operator may issue a DRAW LINE command and then identify the end points of the line to be drawn (i.e. parameter data). In response to operator initiated display commands, subsystem 22 generates elementary display instructions and related parameter data which are sometimes referred to in the art as "primitives". Accordingly, this term will frequently be used hereinafter in discussing the systems revisory capability.

The drawing revisory subsystem 22 as depicted in FIG. 2 consists of a pixel memory subsystem 60. The output of the pixel memory subsystem 60 is connected to the input of the monitor unit 52 of the graphic display terminal 20. As will be discussed hereinafter in greater detail, the subsystem 60 includes a dedicated pixel memory for storing a bit map which is used to control the display monitor 52 on a bit by bit basis. The bit map stored in the pixel memory subsystem 60 is loaded and modified under the control of a graphics function generator 62. The graphics function generator is coupled to the pixel memory subsystem by an address/data/control bus 64. A character/vector generator 66 and a data expansion module 68 are also coupled to the bus 64.

The operator initiated commands provided by the keyboard/pointer unit 50 are supplied to a control microcomputer 70. The microcomputer 70 communicates via the bus 64 and a channel interface module 72 with the host CPU 12. Thus, in response to commands issued by the keyboard/pointer unit 50, the microprocessor 70 can, for example, interrupt the host CPU 12 to access the data set describing the desired drawing from the mass storage unit 14. The data set is communicated by the channel interface module 72 to the bus 64 enabling the data expansion module 68 to expand the highly compressed pixel data set to produce a bit map describing the desired drawing in the pixel memory subsystem 60.

Figure 3:
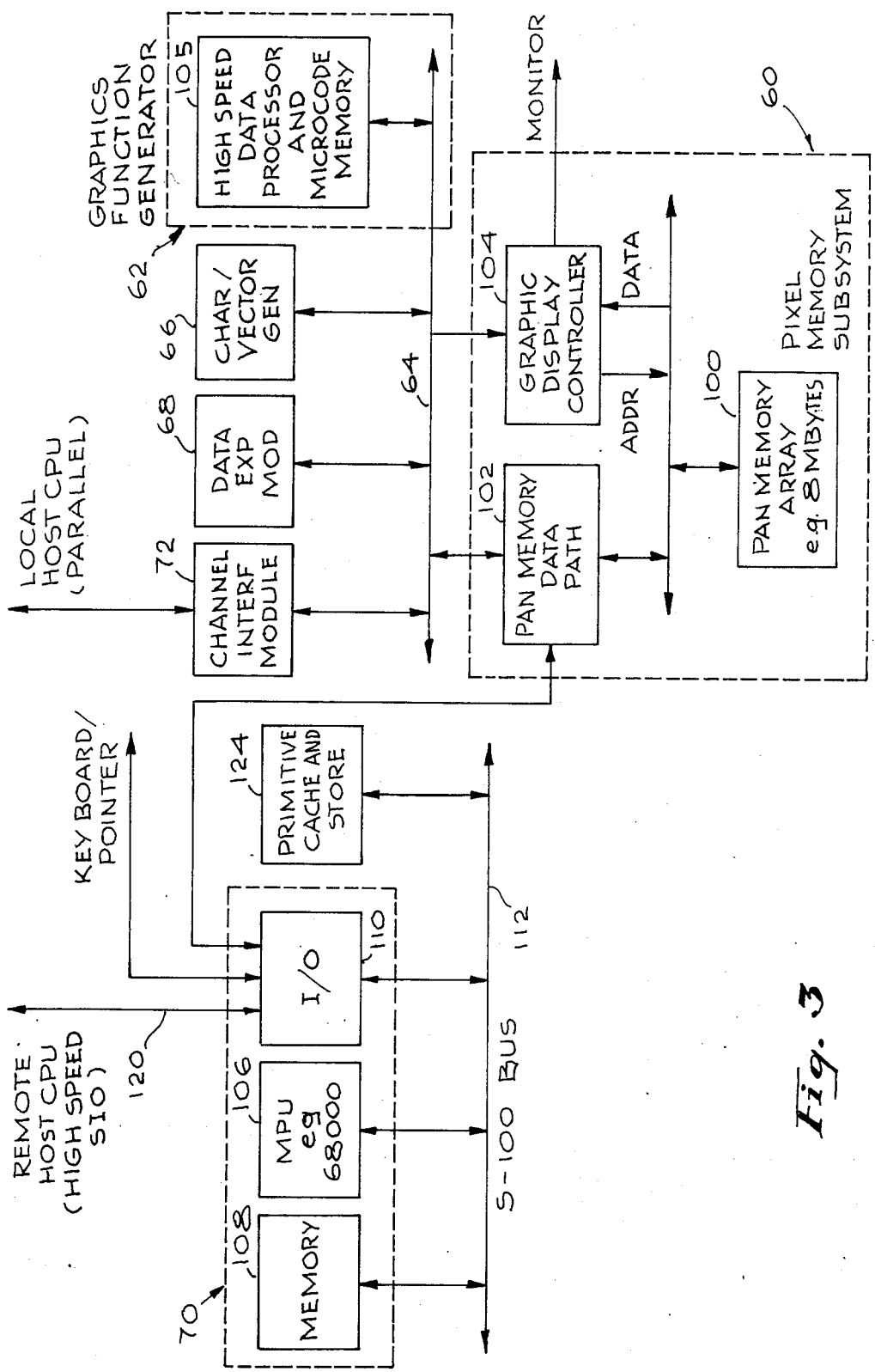
FIG. 3 is a block diagram depicting a preferred embodiment of the drawing revisory subsystem of FIG. 2.

Attention is now directed to FIG. 3 which illustrates a preferred embodiment of the drawing revisory subsystem 22. It is initially pointed out that the pixel memory subsystem 60 includes a memory array 100 preferably containing on the order of eight megabytes (i.e. 67.1 million bits). The memory array 100 will sometimes hereinafter be referred as the "PAN" memory array because it is used to store a bit map defining the panorama or universe of a selected drawing, only a portion of which is displayed by the monitor 52 at any one time. That is, in the preferred embodiment, the monitor 52 acts as an A size drawing window to an E size drawing panorama. Inasmuch as an E size drawing (34×44 inches) having a horizontal and vertical resolution of 200 lines per inch requires 59.8 million pixels, the eight megabyte memory array 100 can accommodate a full E size drawing with capacity remaining for storing additional information; e.g. in performing a zoom function, the extra memory capacity is used to store a bit map of a portion of a drawing depicted on an enlarged scale.

In addition to the memory array 100, the memory subsystem 60 includes a data path module 102 and a graphic display controller 104. the controller 104 functions to access bits from memory array 100 in the appropriate sequence to control the blanking and unblanking of the monitor 52 beam which is deflected by a raster generator (not shown) within controller 104, preferably operating at 158 MHz. Controller 104 preferably refreshes the monitor directly from the memory array 100 at an interlaced frame rate of 30 Hz. A preferred monitor displays 2200 lines vertically (i.e. 200 lines per inch × 11 inches) and 1728 lines horizontally (200 × 8.64 inches).

The graphics function generator 62 comprises a very fast high speed data processor (e.g. bit slice microprocessor) and associated microcode memory 106. The processor 106 is coupled to the aforementioned address-/data/control bus 64. Similarly, the aforementioned character/vector generator 66, data expansion module 68, and channel interface module 72, are connected to the bus 64.

The microcomputer 70 is depicted as being comprised of a single board microcomputer including microprocessor 106, e.g. MOTOROLA 68000. Associated with the microprocessor 106 is a global memory 108 and input/output circuitry 110. The microprocessor 106, memory 108, and I/O circuitry 110 communicate via a standard S-100 bus (IEEE-696) 112. The I/O circuitry 110 is coupled to the PAN memory data path module 102, to be discussed hereinafter. Communication between busses 112 and 64 is effected via I/O circuitry 110 and the data path module 102.

The PAN memory data path module 102 comprises logic circuitry for readily performing simple logical operations (e.g. AND, OR, XOR) with respect to the bit map currently in the PAN memory array 100 and revisory data to produce a modified bit map. It was previously pointed out that the channel interface module is preferably directly coupled to a local host CPU 12. Additionally, the drawing revisory subsystem 22 can be connected to a remote host CPU via a high speed serial channel 120 through I/O circuitry 110 associated with microcomputer 70. The aforementioned keyboard-/pointer 50 also communicates through I/O circuitry 110 with microprocessor 106 via bus 112.

In accordance with a very significant feature of the invention, a module 124 is provided for functioning as a cache memory to store primitives generated during operation in the DRAWING REVISION MODE and as a storage device to store primitives accessed from mass storage during operation in the DRAWING REDISPLAY MODE. Briefly, as the operator uses the keyboard/pointer during the DRAWING REVISION MODE, the microprocessor 106 responds to operator commands to appropriately generate the primitives and transfer them to the graphics function generator 62. The graphics function generator 62 responds to the primitives to modify the bit map in the PAN memory array 100 as instructed by the primitives. As the primitives are forwarded along bus 112 to the graphics function generator 62, the cache and store module 124 recognizes the primitives and stores them on a first in/first out basis. That is, the cache and store module 124 recognizes the primitives as they are being transferred to the graphics function generator, and in parallel stores them in the same sequence they are being transferred. Thus, the module 124 can be considered as operating transparently as far as the microprocessor 106 and the graphics function generator 62 are concerned. As previously noted, the term "primitive" refers to an elementary display instruction and related parameter data and consists of a relatively short ordered list of bytes. Table 3 hereto (shown in FIGS. 9A, 9B, 9C) depicts the byte format of the following exemplary display primitives:

1. DRAW POINT
2. DRAW LINE
3. DRAW ARC
4. COPY BLOCK
5. MOVE BLOCK
6. RECTANGLE FILL

In order to better understand the meaning of "primitive", attention is directed to the exemplary DRAW LINE primitive which is comprised of nine sixteen bit words (words 0–8) with word 1 defining the elementary display instruction, i.e. "DRAW LINE". Word 2 is shown as defining the horizontal value of the starting or origin point and word 3 the vertical value of the same origin point. Word 4 is used to define the horizontal coordinate of the end point and word 5 the vertical coordinate of the end point. Word 6 is used to define a logical operation, e.g. exclusive OR. Additional bits are used to define miscellaneous information including line width, quadrant and slope of the line to be drawn.

The assumed microprocessor 106, i.e. MOTOROLA 68000, has a sixteen bit wide bus. Thus, the nine words associated with the exemplary DRAW LINE primitive are communicated along the bus as nine successive words. In a typical embodiment of the invention, the cache and store module 124 is capable of storing 2000 words, i.e. 4000 bytes, on a first-in/first-out (FIFO) basis.

Figure 4:
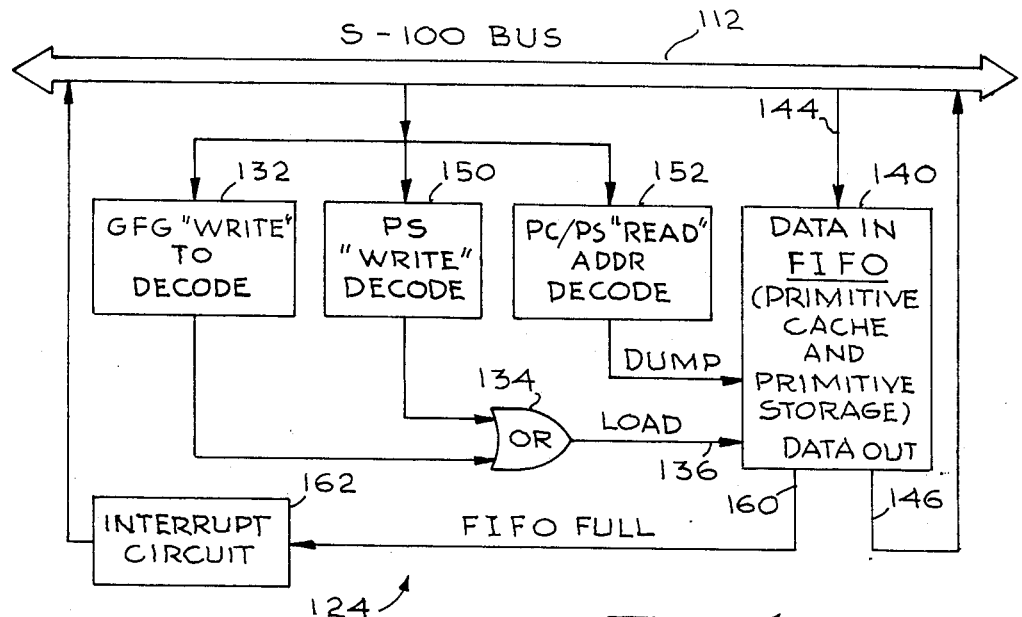
FIG. 4 is a block diagram of the primitive cache and store module depicted in FIG. 3.

In order to better understand the functioning of the cache and store module 124, attention is directed to FIG. 4 which depicts the module 124 in greater detail. During operation in the DRAWING REVISION MODE, the microprocessor 106 will, in response to operator initiated commands, produce a sequence of primitives addressed to the graphics function generator 62, which are supplied along bus 112. These primitives include a subgroup of display primitives which are specially tagged (i.e. uniquely addressed) for caching by the module 124. Microprocessor 106 may produce other primitive addressed to function generator 62 which are for control purposes and need not be cached. Decoder 132 of module 124 recognizes the specially addressed primitives and enables, via OR logic 134, the LOAD control terminal 136 of the array 140. When so enabled, the array 140 will accept data from the bus 112 via data input terminal 144. The array 140 operates in a First-in/first-out (FIFO) fashion and has a data output terminal 146 coupled to the bus 112.

Whereas the decoder 132 operates during the DRAWING REVISION MODE to cache primitives produced by microprocessor 106, decoder 150 operates during the DRAWING REDISPLAY MODE to recognize a group of primitives, generally comprising a drawing REVISION LEVEL for storage in array 140. That is, as will be discussed hereinafter, in the course of retrieving previously stored groups of primitives from mass storage unit 14 associated as a drawing REVISION LEVEL, the groups will be accessed from mass storage unit 14 and loaded via bus 112 and input terminal 144 into the array 140.

A further decoder 152 is provided to recognize an instruction from the microprocessor 106 to read out a group of primitives from the array 140 at the end of a revisory session. That is, a group of primitives cached in the array 140, as a consequence of operation in the DRAWING REVISION MODE, are associated together and placed on the bus 112 for storage in the mass storage unit 14. In so doing, each such group of primitives, comprising a REVISION LEVEL, is linked by appropriate header information to a related drawing or more precisely a particular data set associated with the related drawing.

It should also be noted that the First-in/first-out array 140 depicted in FIG. 4 is provided with an output control terminal 160 which indicates when the array is full. In this event, interrupt circuit 162 is actuated to supply an interrupt via bus 112 to microprocessor 106.

Attention is not directed to FIG. 5 which comprises a flow chart describing system operation in the DRAWING REVISION MODE. The drawing revisory session is initiated by an operator, represented by block 200, by appropriate keyboard commands. The operator will then identify a drawing stored in mass storage and the digital data set related to that drawing will be retrieved and expanded to produce the appropriate bit map in the "pan" memory array 100. This operation is depicted by block 202 in FIG. 5. The data flow required for operation 202 is from the mass storage unit 14 to the host CPU 12 to channel interface module 72 to the data expansion module 68 to the "pin" memory array 100 to the graphic display controller 104 and then to the monitor 52. As previously pointed out, the monitor display an area of an A size drawing, i.e. 1/16th of the E size drawing which can be fully represented by the bit map stored in the "pan" memory array 100. By using the keyboard/pointer 50, the operator can effectively scroll the full drawing represented by the bit map past the monitor window. Block 204 in FIG. 5 represents the operator initiating a pixel edit function, which may for example be selected from a displayed menu. The edit function selected by the operator involves a data transfer from the keyboard/pointer unit 50 to microcomputer 70.

In defining the edit function, the operator may, for example, command the system to draw a rectangle or circle on the displayed drawing at a location identified by the operator by use of the keyboard/pointer 50. The microcomputer 70 then creates a list of primitives as is exemplified by the items in Table 3 (FIGS. 9A, 9B, 9C). This action by microcomputer 70 is represented by block 206. P Microcomputer 70 then generates a command to transfer the primitive list to the graphic function generator 62, via bus 112, "pan" memory data path 102, and bus 64. This action is represented by block 208 and further calls for the graphics function generator 62 to modify the bit map stored in the memory array 100 to execute the revision commanded by the operator. That is, by appropriately modifying the bit map in the memory array 100, the graphic display controller 104 will correspondingly modify the drawing displayed by the monitor 52.

In accordance with an important aspect of the invention, the cache and store module 124 will respond to the primitive list transfer represented by block 208 to cache those primitives tagged by microprocessor 106. This action, represented by block 210, occurs in parallel with the operations represented by block 208 in a manner which is transparent to the operator.

After the execution of blocks 208 and 210, if the operator has not completed the revisory session, then operation loops back to block 204. However, after decision block 212 detects the end of a revisory session, as indicated by an operator input a command will be sent from the keyboard/pointer 50 to the microprocessor 70 (block 214). Microcomputer 70 will thereafter issue an instruction to cause decoder 152 to read out the contents (i.e. group of primitives) of the first-in/first-out array 140 to the host CPU 12 for storage in the mass storage unit 14. In storing a group of primitives read out of array 140, the host CPU 12 will append a REVISION LEVEL designation and also information linking each such REVISION LEVEL to a particular underlying drawing. This, a header for a data set containing a group of primitives resulting from a single revisory session will include an identification of the underlying drawing, e.g. drawing 000001 and REVISION LEVEL A. This action by the host CPU 12 is represented by block 218. As is well known in the art, the mass storage unit can also store a directory indicating relationships between stored data sets.

Attention is now directed to FIG. 6 which comprises a flow chart depicting operation during the DRAWING REDISPLAY MODE. The DRAWING REDISPLAY MODE is initiated by the operator via a keyboard input represented by block 300. By initiating this operational mode and designating the drawing to be displayed, the data set describing that drawing will be retrieved from mass storage unit 14 to modify the bit map in memory array 100 to thus cause the monitor to display the drawing (block 302). The operation represented by block 302 corresponds to that represented by block 202 in FIG. 5.

Thereafter, the operator can request any stored REVISION LEVELS for the drawing displayed by the monitor. This is, in response to an appropriate keyboard input, the microcomputer 70 will command the host CPU 12 to retrieve the desired REVISION LEVEL, i.e. group of primitives, from the mass storage unit 14. This operation is represented by block 304.

In response, the host CPU 12 retrieves the appropriate REVISION LEVEL and transfers the primitives thereof to the First-in/first-out array 140 via decoder 150. This operation is represented by block 306. With the primitives of the desired REVISION LEVEL stored in the array 140, the microcomputer 70 will read the primitives out sequentially and route them via bus 112, and data path module 102 to the graphics function generator 62 (block 308). The graphics function generator 62 will then respond to revise the bit map stored in the memory array 100 (block 310) to modify the displayed drawing.

Figure 7:
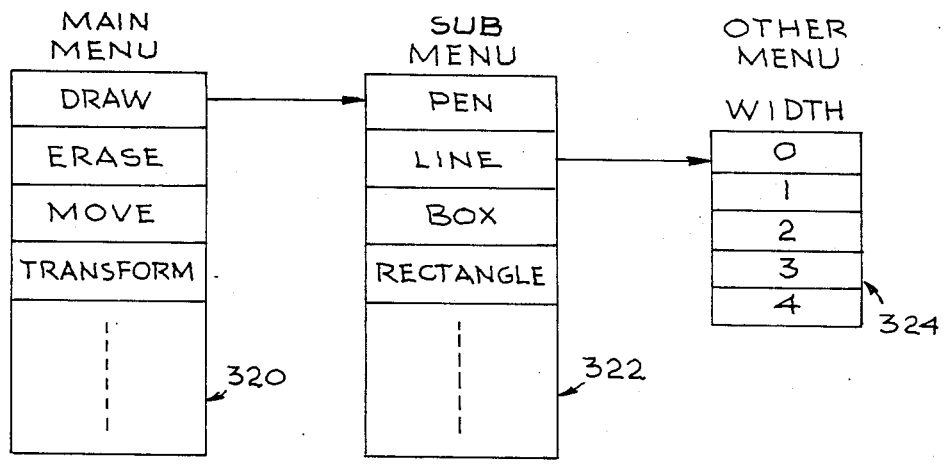
FIG. 7 depicts exemplary display menus.
Figure 8:
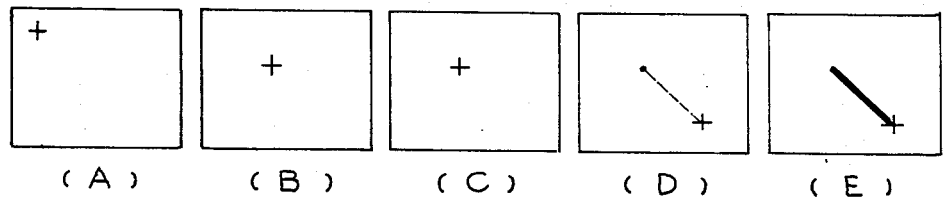
FIG. 8 depicts the execution of an exemplary command.

In order to better understand the use of the system by an operator to revise a displayed drawing, attention is directed to FIGS. 7 and 8 which depict an exemplary monitor presentation for performing a DRAW LINE revision. FIG. 7 depicts three exemplary menus which are successively displayed to the operator. More particularly, a main menu 2 is depicted which gives the operator choices of the following commands: DRAW, ERASE, MOVE, TRANSFORM, etc. By utilizing the aforementioned pointing devices, i.e. mouse or graphic tablet, the user is able to designate the DRAW command, for example. The system will then respond by displaying menu 322 which offers: PEN, LINE, BOX, RECTANGLE, etc. The operator can then select, for example, the LINE entry which produces the next menu 324 which prompts the operator to select a line width.

Attention is now called to FIG. 8 which depicts successive monitor screens which would appear to the operator in the course of his performing a DRAW LINE operation. In response to the operator's selection of the DRAW and LINE options in the menus of FIG. 7, a cursor will appear on the screen as depicted in FIG. 8A. By utilizing the aforementioned pointing device, the operator can move the cursor to an origin or point at which he or she wants the line to start. This is represented in FIG. 8B. The operator will then press an action button (e.g. on the mouse) to thereby fix the origin of the line as depicted by FIG. 8C. The operator will then move the cursor to the end point of the line. This is depicted by FIG. 3D which also shows that the screen displays a rubber band like line trailing the cursor from the origin point. When the operator positions the cursor from the origin point, he or she will again press the action button to cause the system to draw a solid line of specified width between the origin point and the end point, as depicted in FIG. 8E.

To enable the system to present the display screens depicted in FIG. 8, the microprocessor 106 generates a series of primitives which address the graphics function generator 62 to cause it to modify the bit map within the "pan" memory array 100. Thus, for example, microprocessor 106 generates a COPY BLOCK primitive to move the cursor onto the screen as depicted in FIG. 8A.

As the operator moves the cursor into position at the desired origin point, the microprocessor 106 will issue many COPY BLOCK primitives designating exclusive OR logical operations, to remove each previously displayed cursor so that only a single cursor is displayed at a time.

When the operator presses the action button to fix the origin of the line, as depicted by FIG. 8C, the microprocessor 106 will generate the DRAW POINT primitive. As the operator then moves the cursor from the origin point to the line end point, as depicted by FIG. 8D, many COPY BLOCK primitives will be generated to successively remove or erase each previously displaced cursor. Additionally, many DRAW LINE primitive will be generated to create the aforementioned rubber band effect connecting the fixed origin point with the moving cursor. These DRAW LINE primitives occur in pairs with an exclusive OR operation being used to remove a previous line as each new line is displayed.

When the action button is depressed to draw a solid line between the origin point and line end, as depicted in FIG. 8E, a DRAW LINE primitive is generated by the microprocessor 106 which causes the line of specified width to be drawn. It is that last DRAW LINE primitive which is specially addressed by the microprocessor 106 so that in addition to causing the graphic function generator 62 to modify the bit map in the pan memory array 100, it also caches the DRAW LINE primitive in the cache and store module 124.

From the foregoing, it should now be understood that a system has been disclosed herein for efficiently storing, revising, and redisplaying drawings. By originally storing the raw pixel data in highly compressed binary form, many thousands of drawings can be reasonably stored in available mass storage units (see Table 2). This compressed binary data is expanded when accessed to produce a bit map in the PAN memory for controlling the display monitor. Revisory data is efficiently stored by utilizing a cache memory for automatically storing primitives and associating one or more primitives as a designated REVISION LEVEL linked to an underlying drawing. In the REDISPLAY MODE, these primitives, which represent a highly compressed form of pixel data, are retrieved from mass storage and utilized to modify the bit map currently in PAN memory 100. Accordingly, it should now be understood that in contrast to prior approaches which store data sets representing the latest revision of a drawing, a system in accordance with the present invention retains data sets in compressed binary form representing the pixel data in the original drawing and in addition revisory pixel data in the form of primitives of each REVISION LEVEL. When the latest revision of a drawing is desired, the original drawing is accessed and then each REVISION LEVEL is accessed in sequence to thus successively modify the displayed drawing frame by frame in incremental or cinematic fashion.

We claim:

1. A system suitable for electronically storing, revising, and displaying technical drawings comprising:

mass storage means for storing multiple data sets, each data set comprising digital data defining a pixel representation of a different technical drawing;

operator input means for enabling an operator to selectively identify a data set stored in said mass storage means;

monitor means for displaying a drawing; and control means responsive to said operator input means for controlling said monitor means to display at least a portion of the drawing identified by said input means, said control means including:

pixel memory means for storing a bit map of a drawing;

processor means for retrieving each data set identified by said operator input means and responsive to the digital data therein for loading a bit map into said pixel memory means;

means responsive to said bit map stored in said pixel memory means for causing said monitor to display pixels representing the identified drawing;

said operator input means including means enabling an operator to define a DRAWING REVISION MODE and to initiate the generation of primitives, each primitive defining an elementary display instruction and related parameter data;

said processor means including means reponsive to each of said generated primitives for revising said bit map stored in said pixel memory means; and cache means for temporarily storing each of said generated primitives.

2. The system of claim 1 further including means for grouping primitives stored in said cache means as a designated revision level;

means for storing each revision level primitive group in said mass storage means; and means for storing linking information associating each revision level primitive group with one of said drawings.

3. The system of claim 2 wherein said operator input means includes means enabling an operator to define a DRAWING REDISPLAY MODE;

means active during said DRAWING REDISPLAY MODE for retrieving from said mass storage means revision level primitive groups associated with the drawing concurrently displayed by said monitor; and wherein said processor means includes means for revising said bit map stored in said pixel memory means in response to each revision level primitive group retrieved from said mass storage means.

4. The system of claim 3 wherein said means for revising said bit map operates in an incremental manner, whereby said monitor displays in sequence an identified drawing and subsequent revision levels of that drawing.

5. The system of claim 2 wherein each of said data sets defining a technical drawing is stored as compressed binary data in said mass storage means; and wherein
said processor means includes means for expanding the compressed binary data for producing said bit map.

6. The system of claim 2 wherein said processor means includes:
control means including a microprocessor and a data/control bus coupled thereto;
means coupling said operator input means to said control means microprocessor;
graphic function generator means for producing and revising said bit map;
means for coupling said graphic function generator means to said data/control bus whereby said control means microprocessor generates primitives addressing said function generator means; and wherein
said cache means is coupled to said data/control bus and is responsive to primitives addressed to said function generator means for automatically storing said primitives.

7. The system of claim 1 wherein said mass storage means comprises an optical storage unit.

8. The system of claim 1 wherein said cache means comprises a first in/first out read/write memory.

9. A method of storing, displaying and revising existing technical drawings comprising:
scanning said drawings to produce a different set of digital data related to each drawing;
storing each of said digital data sets in a mass storage unit;
accessing a selected one of said data sets to produce a bit map;
responding to said bit map to display the drawing related to said accessed data set;
generating binary coded primitives each defining a display instruction and related parameters;
responding to said generated primitives to revise said bit map;
grouping selected ones of said generated primitives as a revision level;
storing each revision level primitive group together with information linking each group with a stored data set; and
retrieving stored revision level groups associated with the same drawing to sequentially revise the displayed drawing one revision level at a time.

10. The method of claim 9 wherein said scanning step includes producing a stream of bits each representative of a different pixel on a drawing; and including the further step of
compressing said bit stream to produce each data set.

11. The method of claim 10 wherein said accessing step includes expanding the selected data set to produce said bit map.

12. The method of claim 10 wherein said step of storing each revision level group comprises storing the primitives thereof in a mass storage unit; and including the further step of;
automatically temporarily storing each of said generated primitives in a cache memory.

* * * * *

UNITED STATES PATENT AND TRADEMARK OFFICE
CERTIFICATE OF CORRECTION

PATENT NO. : 4,665,555
DATED : 05/12/87
INVENTOR(S) : Bruce B. Alker and Michael J. McGovern It is certified that error appears in the above—identified patent and that said Letters Patent is hereby corrected as shown below:

The attached drawing Figures 9A, 9B and 9C were inadvertently omitted from the patent as issued.

Signed and Sealed this

Seventeenth Day of May, 1988

Attest:

DONALD J. QUIGG

*Attesting Officer*    *Commissioner of Patents and Trademarks*

1. DRAW POINT

| | 15 | | | | | 8 | 7 | 6 | 5 | 4 | 3 | 2 | 1 | 0 | |
|---|---|---|---|---|---|---|---|---|---|---|---|---|---|---|---|
| 0001 | 0 ←—————————————————→ 0 1 | | | | | | | | | | | | | | WRITE COMMAND |
| 8101 | 1 0 0 0 0 0 0 1 0 0 0 0 0 0 0 1 | | | | | | | | | | | | | | GRAPHIC, DRAW PT. OP |
| XXXX | ←————— X ORIGIN —————→ | | | | | | | | | | | | | | |
| XXXX | ←————— Y ORIGIN —————→ | | | | | | | | | | | | | | |

NOTE: REGISTER LG IS USED TO DETERMINE LOGICAL OPERATION (i.e. XOR, SET..., CLEAR). REGISTER Wx IS USED TO DETERMINE THE # OF POINTS TO DRAW IN X

2. DRAW LINE

| | | |
|---|---|---|
| 0001 | 0 ←—————————————→ 0 1 | WRITE COMMAND |
| 8102 | 1 0 0 0 0 0 0 1 0 0 0 0 0 0 0 1 | GRAPHIC, DRAW LINE C |
| XXXX | X ORIGIN | |
| | Y ORIGIN | |
| | X END POINT | |
| XXXX | Y END POINT | |
| 0XX0 | LOGICAL OPERATION | |
| XXOX | LINE WIDTH \| RESV'D \| QUAD | |
| XXXX | SLOPE OR dx/dy | |

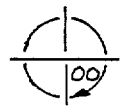

3. DRAW ARC

| | | |
|---|---|---|
| 0001 | 0 ←—————————————→ 0 1 | WRITE COMMAND |
| 8104 | 1 0 0 0 0 0 0 1 0 0 0 0 0 1 0 0 | GRAPHIC, DRAW ARC C |
| XXXX | X CENTER | |
| | Y CENTER | |
| XXXX | LOGICAL OPERATION | |

*Fig. 9A*

4. COPY BLOCK

| | |
|---|---|
| 0001 | 0 ← → 0 1 |
| 8201 | 1 0 0 0 0 0 1 0 0 0 0 0 0 0 0 1 |
| XXXX | X (SOURCE) |
| XXXX | Y (SOURCE) |
| XXXX | # OF BITS IN X (SOURCE) |
| XXXX | # OF LINES IN Y (SOURCE) |
| XXXX | X (DESTINATION) |
| XXXX | Y (DESTINATION) |
| ↓ | LOGICAL OPERATION |

01C0 = REPLACE (STORE)
00D0 = OR
00C0 = XOR
00E0 = AND

5. MOVE BLOCK

| | |
|---|---|
| 0001 | 0 ← → 0 1 |
| 8202 | 1 0 0 0 0 0 1 0 0 0 0 0 0 0 1 0 |

SAME AS COPY BLOCK EXCEPT THAT SOURCE IS AUTOMATICALLY CLEARED

*Fig. 9B*

6. RECTANGLE FILL

| | |
|---|---|
| 0001 | 0◄─────────────────────►01 |
| 8204 | 1 0 0 0 0 0 1 0 0 0 0 0 0 1 0 0 |
| XXXX | X (DESTINATION) |
| XXXX | Y (DESTINATION) |
| XXXX | # OF BITS IN X (DESTINATION) |
| XXXX | # OF BITS IN Y (DESTINATION) |
| | LOGICAL OPERATION |
| XXXX | FILL PATTERN |

*Fig. 9C*